United States Patent [19]

Stanfill

[11] Patent Number: 5,367,677
[45] Date of Patent: Nov. 22, 1994

[54] SYSTEM FOR ITERATED GENERATION FROM AN ARRAY OF RECORDS OF A POSTING FILE WITH ROW SEGMENTS BASED ON COLUMN ENTRY VALUE RANGES

[75] Inventor: Craig W. Stanfill, Waltham, Mass.
[73] Assignee: Thinking Machines Corporation, Cambridge, Mass.
[21] Appl. No.: 96,192
[22] Filed: Jul. 21, 1993

Related U.S. Application Data

[63] Continuation of Ser. No. 522,608, May 11, 1990, abandoned.

[51] Int. Cl.[5] .................................................. G06F 15/40
[52] U.S. Cl. .................................. 395/600; 340/146.2;
364/DIG. 1; 364/246.3; 364/282.1; 364/246;
364/238.6; 364/231.9; 364/230; 364/230.3;
395/725; 395/800
[58] Field of Search .................... 395/600, 725, 800;
340/146.2

[56] References Cited

U.S. PATENT DOCUMENTS

| | | | |
|---|---|---|---|
| 3,350,695 | 12/1964 | Kaufman et al. | 364/200 |
| 3,568,156 | 3/1971 | Thompson | 340/172.5 |
| 3,651,483 | 3/1972 | Clark, IV et al. | 340/172.5 |
| 4,011,545 | 4/1975 | Nadir | 340/172.5 |
| 4,255,796 | 3/1981 | Gabbe et al. | 364/900 |
| 4,422,158 | 12/1983 | Galie | 395/400 |
| 4,450,520 | 5/1984 | Hollaar et al. | 364/200 |
| 4,451,901 | 5/1984 | Wolfe et al. | 395/600 |
| 4,553,206 | 11/1985 | Smutek et al. | 395/275 |
| 4,598,400 | 7/1986 | Hillis | 370/60 |
| 4,606,002 | 8/1986 | Waisman et al. | 395/600 |
| 4,633,393 | 12/1986 | Rundell | 395/800 |
| 4,736,308 | 4/1988 | Heckel | 364/518 |
| 4,769,772 | 9/1988 | Dwyer | 395/600 |
| 4,811,199 | 3/1989 | Kuechler et al. | 364/200 |
| 4,814,973 | 3/1989 | Hillis | 364/200 |
| 4,823,306 | 4/1989 | Barbic et al. | 395/600 |
| 4,870,568 | 9/1989 | Kahle et al. | 395/600 |
| 4,887,260 | 12/1989 | Carden et al. | 370/60 |
| 4,984,235 | 1/1991 | Hillis et al. | 370/60 |
| 5,117,420 | 5/1992 | Hillis et al. | 370/60 |
| 5,128,860 | 7/1992 | Chapman | 364/401 |
| 5,168,554 | 12/1992 | Luke | 395/161 |
| 5,237,678 | 8/1993 | Kuechler et al. | 395/600 |
| 5,263,165 | 11/1993 | Janis | 395/600 |

OTHER PUBLICATIONS

Ellis Horowtiz and Sartaj Sahni, Fundamentals of Data Structures, pp. 134–155, Computer Science Press, 1977.
Stanfill, C., et al., "A Parallel Indexed Algorithm for Information Retrieval," Proc., ACM Conf on Research and Development in Information Retrieval, Jun. 1989, pp. 88–97.

Primary Examiner—Thomas C. Lee
Assistant Examiner—Wayne Amsbury
Attorney, Agent, or Firm—Richard A. Jordan

[57] ABSTRACT

A query processing system for processing queries in connection with a document text base which has entries each identifying a document and a word in the document. The query processing system includes a plurality of processing elements for processing data in response to commands, and a control arrangement for controlling the processing elements in parallel. The control arrangement first enables the processing elements to generate a segmented posting file having entries, at least some of which have a word identifier and a document identifier. The entries form an array all of whose entries with the same document identifier are contained within one column. The rows of the segmented posting file are aggregated into segments each having a selected number of rows with each segment containing entries having word identifiers within an identified word identifier range. Thereafter, the control arrangement enables the processing elements to use the segmented posting file to process, in parallel, a query in a series of iterations each with respect to a query word. In each iteration, the processing elements receive respective portions of columns comprising a segment of the segmented posting file associated with the word identifier range containing the query word, then identify entries in the segment whose word identifiers correspond to the query word, and finally modify a score maintained for the document identified in the identified entry. Those documents which have a selected score at the end of the series of iterations have the required relationship to the query.

46 Claims, 11 Drawing Sheets

30 GENERATE A SEGMENTED POSTING FILE IN RESPONSE TO AN ORIGINAL POSTING FILE

31 STORE SEGMENTED POSTING FILE IN SECONDARY STORAGE WITH EACH ROW OF SEGMENTED POSTING FILE COMPRISING A UNIT OF STORAGE

32 RECEIVE QUERY AND IDENTIFY ELEMENTS THEREOF

33 IDENTIFY SEGMENTS OF SEGMENTED POSTING FILE WHICH ARE ASSOCIATED WITH QUERY ELEMENTS

34 LOAD STORAGE UNITS ASSOCIATED WITH IDENTIFIED SEGMENTS INTO PROCESSOR ARRAY

35 ESTABLISH QUERY SCORE TABLE IN PROCESSOR ARRAY

36 PERFORM QUERY PROCESSING OPERATION IN CONNECTION WITH A QUERY ELEMENT

37 UPDATE QUERY SCORE TABLE TO REFLECT RESULTS OF QUERY PROCESSING OPERATION

38 HAS QUERY PROCESSING OPERATION BEEN PERFORMED IN CONNECTION WITH ALL QUERY ELEMENTS ?

NO → (loop back to 36)

YES ↓

39 USE CONTENTS OF QUERY STORE TABLE TO GENERATE A QUERY RESPONSE

QUERY SCORE TABLE 90

| PE 13A | PE 13B | ... | PE 13M |
|--------|--------|-----|--------|
| REC 0 | REC 1 | ... | REC N-1 |
| REC N | REC N+1 | ... | REC 2(N-1) |
| ... | ... | ... | ... |
| REC X | REC Y | ... | REC Z |

91A, 91B, 91M

92(i)(α)

SEGMENTED POSTING FILE GENERATION

100 LOAD TOKENS INTO TOKEN SLOTS IN PROCESSING ELEMENTS USING RECORD ID TO IDENTIFY PROCESSING ELEMENT TO RECEIVE EACH TOKEN

101 ORDER TOKENS IN PROCESSING ELEMENTS IN ORDER OF WORD ID'S TO FORM WORKING LISTS

102 SELECT A SEGMENT SIZE FACTOR

103 BROADCAST BASE ADDRESS OF WORKING LISTS TO PROCESSING ELEMENTS, ENABLE THEM TO STORE BASE ADDRESS AS WORKING LIST ADDRESS

FIG 7B (B)

104 ENABLE PROCESSING ELEMENTS TO COPY WORKING LIST ADDRESS TO RESPECTIVE WORKING LIST POINTERS

105 INITIALIZE A ROW COUNTER

106 ENABLE PROCESSING ELEMENTS TO INCREMENT WORKING LIST POINTER BY SEGMENT SIZE FACTOR

107 ENABLE PROCESSING ELEMENTS TO USE RESPECTIVE WORKING LIST POINTERS TO IDENTIFY TOKENS IN WORKING LISTS AND TO PERFORM GLOBAL MINIMUM OPERATION ON IDENTIFIED TOKENS. SAVE RESULT AS A TEST VALUE (A) FIG 7B

FIG. 7A

SEGMENTED POSTING FILE GENERATION (2D EMBODIMENT)

150 LOAD TOKENS INTO TOKEN SLOTS IN PROCESSING ELEMENTS, USING RECORD ID TO IDENTIFY PROCESSING ELEMENT TO RECEIVE EACH TOKEN

151 ORDER TOKENS IN PROCESSING ELEMENTS IN ORDER OF WORD ID'S TO FORM WORKING LISTS

152 INITIALIZE A WORKING LIST POINTER, A WORKING LIST SEGMENT POINTER AND A SEGMENT BOUND POINTER AND A SEGMENT BOUND TABLE

153 SELECT A SEGMENT SIZE FACTOR

154 INCREMENT WORKING LIST SEGMENT POINTER BY SEGMENT SIZE FACTOR

FIG 9B (C) ⟶

155 IDENTIFY SMALLEST WORD ID AMONG TOKENS IN WORKING LISTS MAINTAINED BY ALL PROCESSING ELEMENTS, SAVE IDENTIFIED WORD ID AS TEST VALUE

FIG 9B (B) ⟶

156 ENABLE COMPARISON TO DETERMINE IF WORD ID OF TOKEN IN WORKING LIST POINTED TO BY WORKING LIST POINTER IS LESS THAN OR EQUAL TO TEST VALUE ?

YES (A) FIG 9B

FIG. 9A

SYSTEM FOR ITERATED GENERATION FROM AN ARRAY OF RECORDS OF A POSTING FILE WITH ROW SEGMENTS BASED ON COLUMN ENTRY VALUE RANGES

This is a continuation of co-pending application Ser. No. 07/522,608, now abandoned, filed on May 11, 1990.

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. Pat. No. 4,984,235, issued Jan. 8, 1991, to W. Daniel Hillis, et al, for Method and Apparatus For Routing Message Packets, and assigned to the assignee of the present application, incorporated herein by reference.

FIELD OF THE INVENTION

The invention relates generally to the field of digital computers, and more particularly to systems for retrieving information in response to queries. In one particular application, the invention provides a system to facilitate identification of records which contain words or terms set forth in a query.

BACKGROUND OF THE INVENTION

In addition to performing extensive and repetitive computations, digital computers are often used in the management and retrieval of vast amounts of data. One particularly important task for computers is to identify records, such as documents, that contain words or terms (collectively referred to as "words") set forth in a query. A number of systems have been developed to accomplish this, some of them also responding to more sophisticated queries such as identification based on proximity of the query words within a record or the presence of some of the words and not others.

A number of query systems have been developed. Typically, the systems use an "inverted file" in which the distinct words contained in all of the records are arranged in a predetermined order, such as alphanumerically. Each word is associated with the identification of the records containing the word. If a system is to respond to queries regarding proximity of words to each other within a record, the inverted file may also identify the location of the word within each record. In processing a query, the system uses the inverted file to identify records containing the words in the query, and locations of the words within the records. The system can then identify those records which contain words which satisfy the query.

As refinements, query systems have also been developed which respond to queries based on weighting values associated with the words in the record and in the queries. The weighting values may be associated, for example, with such factors as the importance, as determined by an external source, of the associated words in the record and the query, the number of times the word appears in the record, and so forth. In responding to a query, such a query system may use the weights to generate a score for each record which, except for the weighting values, would satisfy the query, and identify those records with the highest scores or whose scores exceed a selected threshold value. Such query systems may provide a ranking for those records which satisfy the query.

Generally, the query systems, as described above, have been processed on conventional serial computer systems. Recently, massively parallel computer systems have been developed which can process large amounts of data in parallel. One such computer system is generally described in the aforementioned Hillis patents and Hillis, et al, patent application. In such a computer system, a host 10 computer controls a processing array comprising a large number of processing elements, the host 10 computer controlling the processing elements in unison. The processing elements can also transfer data to other processing elements using several data routers, and can also transfer data to external mass storage devices.

Query systems have been described for such massively parallel computers. In one query system, described in C. Stanfill, et al., "A Parallel Indexed Algorithm for Information Retrieval,", *Proceedings, ACM Conference on Research and Development in Information Retrieval,* June, 1988, pp. 88–97, each processing element is associated with a word in each document. If, as is likely, the words for each record will be associated with several processing elements, generation of scores in response to a query may require transmission of score information for each record over the data router. This can lengthen processing time if the number of words and records is large.

SUMMARY OF THE INVENTION

The invention provides a new and improved query processing system for use in connection with a massively parallel computing system which minimizes the transfers of information between processing elements, thereby increasing the rate at which queries can be processed.

In brief summary, the invention provides a query processing system for processing queries in connection with a record base, such as a document text base which identifies, for each of a plurality of documents, the words contained in the document. The record base includes a plurality of record base entries each of which includes a record identifier (for example, a document identifier to identify the document) and a word identifier. In addition, each query contains at least one query word. The query processing system identifies records having a selected relationship between the query and the word identifiers contained in the record base, for example, to identify the documents which contain the most words that conform to the query words. The query processing system, in one aspect including a plurality of processing elements, each having a memory having a plurality of storage locations for storing data and a processor for processing the data in response to commands, and a control arrangement that generates the commands for controlling the processing elements. The control arrangement includes a segmented posting file generation control portion and a query processing control portion.

The segmented posting file generation control portion provides commands to enable the processing elements to generate, in response to the record base, a segmented posting file. The segmented posting file so generated has a plurality of entries, at least some of the entries having a word identifier and a record identifier, the entries being represented by an array including a plurality of columns and rows. All of the entries in the segmented posting file with the same record identifier are contained within one column. The rows of the segmented posting file are aggregated into segments each having a selected number of rows with each segment containing entries having word identifiers within an identified word identifier range. The segmented posting file generation control portion generates the commands so as to enable the processing elements to generate the columns of the segmented posting file in parallel.

The query processing control portion provides, in a series of iterations each with respect to a query word in the query, commands to enable the processing elements to, in parallel, perform a series of operations. First during an iteration, the processing elements are enabled, in parallel, to receive and store in their respective memories respective portions of columns including a segment of the segmented posting file associated with the word identifier range containing the query word. Thereafter, the processing elements, in parallel, identify entries in the segment whose word identifiers correspond to the query word. Finally, the processing elements, in parallel, modify a score maintained for the record identified in the identified entry. Those records which have a selected score at the end of the series of iterations are determines to have the required selected relationship to the query.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 comprises a flow diagram generally depicting the operations performed in connection with the new query processing system constructed in accordance with the invention;

FIGS. 3, 4, 5, 6 depict data structures, including, respectively, an input posting file, a working file, a segmented posting file, and a query score table, used by the new query processing system;

FIGS. 7A and 7B together comprise a flow diagram depicting operations performed by the new query processing system in establishing the segmented posting file depicted in FIG. 5;

FIGS. 9A and 9B together comprise a flow diagram depicting alternate operations performed by in establishing the segmented posting file depicted in FIG. 5.

DETAILED DESCRIPTION OF AN ILLUSTRATIVE EMBODIMENT

Figure 1:
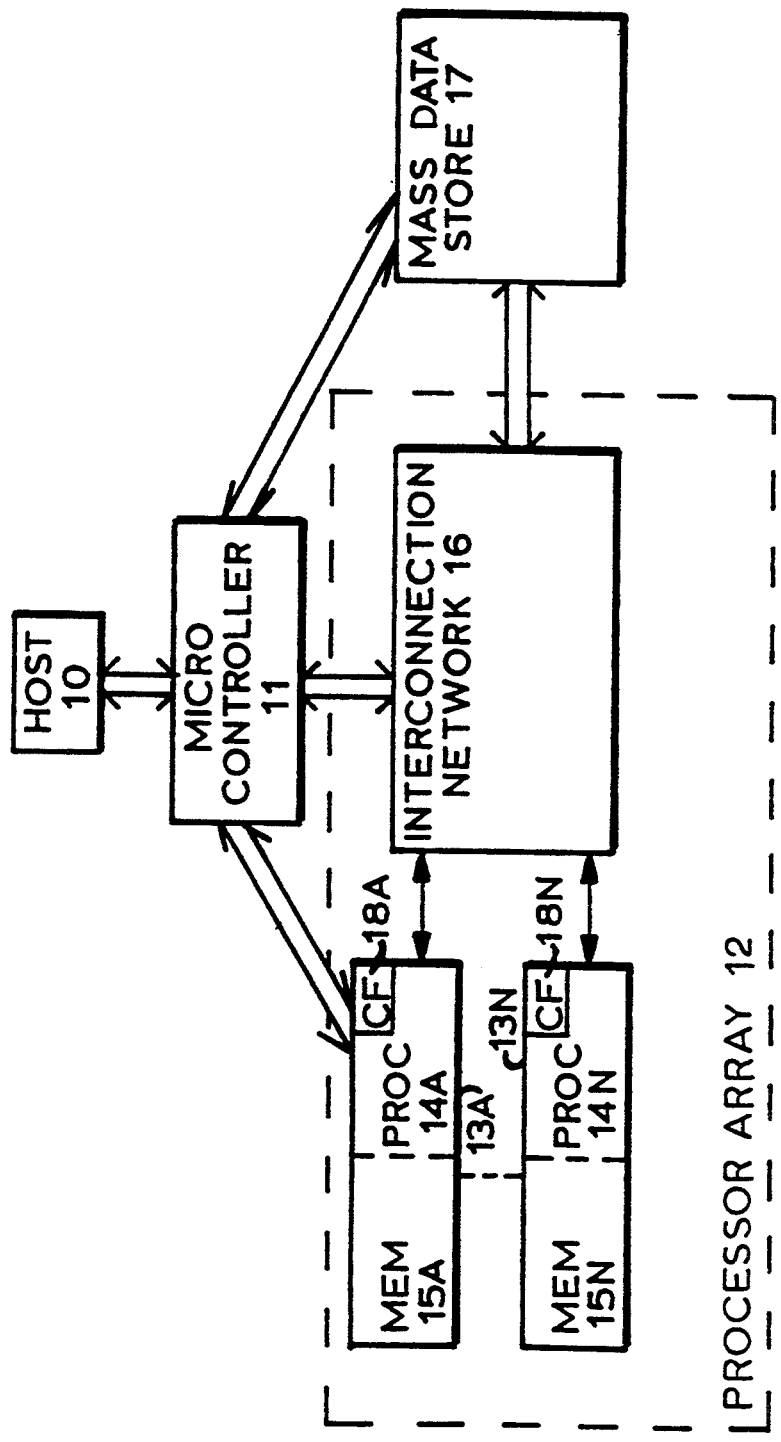
FIG. 1 is a functional block diagram of a massively parallel computer in which the invention can be implemented.

A query processing system constructed in accordance with the invention can be implemented in a massively parallel computer having a functional organization such as depicted in the aforementioned Hillis patents and Hillis, et al., patent application. Such a computer is generally depicted in the block diagram of FIG. 1. With reference to FIG. 1, the massively parallel computer includes a host 10 which transmits commands to a micro-controller 11 to control processing by a processor array 12. The processor array 12 includes a number of processing elements 13A through 13N [generally identified by reference numeral 13($i$)], each including a processor 14($i$) and a memory 15($i$).

The micro-controller 11 transmits control signals that enable the processors 14($i$) to, in parallel, process items of data in their respective memories 15($i$). In one embodiment, the addresses of locations in the memories 15($i$) to be processed by the processors 14($i$) can be selectively provided either by the micro-controller 11, or they may be generated and maintained locally at each of the processors 14($i$). The control signals provided by the micro-controller 11 enable the processors 14($i$) to use either the locally-generated addresses or addresses provided by it in identifying locations containing data to be processed.

In addition, processing by particular ones of the processors 14($i$) can be conditioned on results of previous processing. In particular, each processor 14($i$) includes a context flag 18A through 18N [generally identified by reference numeral 18($i$)] that the processor 14($i$) can, when enabled by the micro-controller 11, set or clear in response to its processing. The micro-controller 11 can condition processing by each of the processors 14($i$) in response to the condition of the respective context flag 18($i$).

In addition, the processor array 12 includes an interconnection network 16 which, under control of the micro-controller 11, transfers data among the processing elements 13($i$) and between the processing elements 13($i$) and a mass data store 17. In one embodiment, the mass data store 17 generally stores data from the processing elements 13($i$) organized in rows. That is, the mass data store 17 stores, in a group of successive storage locations, an item from all processors 14($i$), with successive groups storing differing items. In that embodiment, a unit of storage in the mass data store 17 effectively comprises a group of storage locations in the mass data store 17, so that the mass data store 17 an integral number of items to the processing elements 14($i$) in one transfer operation. It will be appreciated that the data in other embodiments of the mass data store 17 may be organized in a number of ways, and that a query processing system in accordance with the invention may be implemented in a massively parallel computer which does not include a mass data store 17.

With this background, the query processing system will be described in connection with the flow charts and data structure diagrams depicted in FIGS. 2 through 8B. Preliminarily, the query processing system may be implemented in suitable programming of the massively parallel computer depicted in FIG. 1. With reference to FIG. 2, the system first receives an original posting file and generates in response thereto a segmented posting file (step 30). This may be accomplished by the host 10, or by the processing elements 14($i$) in the processing array 12 under control of the host 10.

Figures 3, 4:
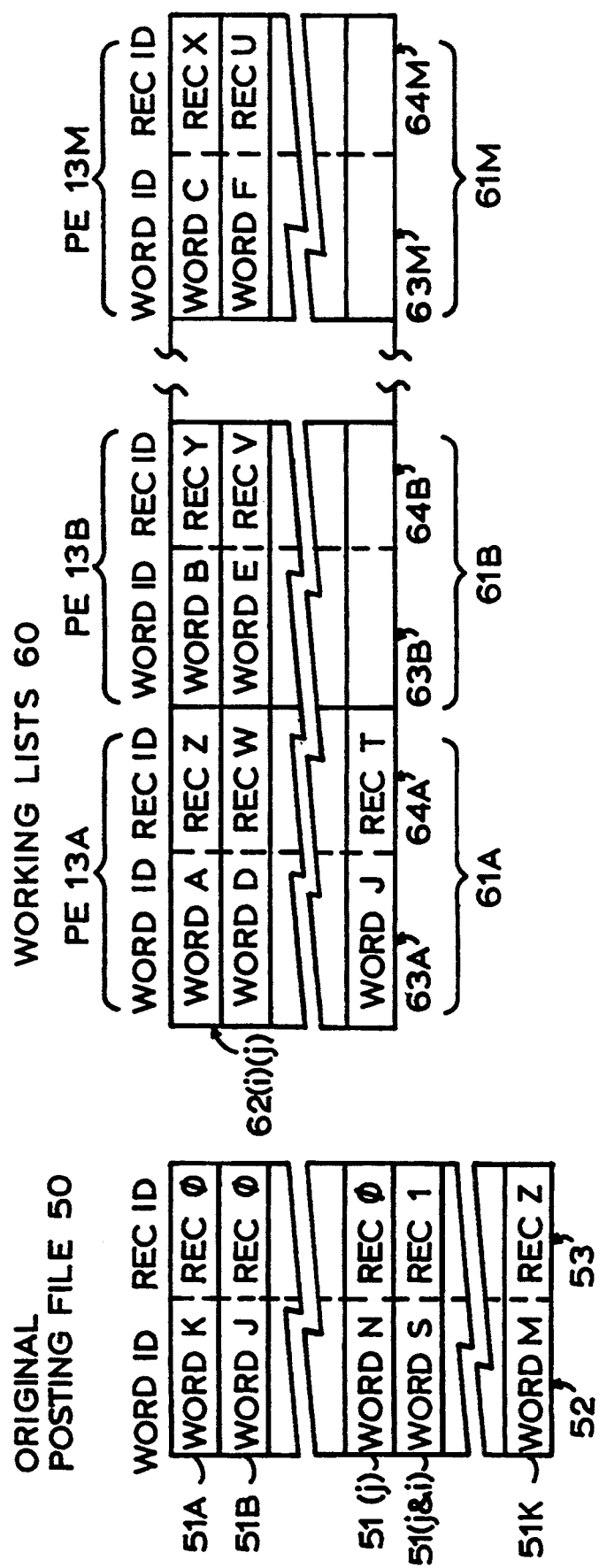

The structure of an original posting file and a segmented data structure will be described below in connection with FIGS. 3 and 5. Briefly, an original posting file comprises a series of tokens, each token containing the identification of a word and the identification of a record, with the tokens being organized in word identification order. Within each group of tokens with the same word identification, the tokens are organized in record identification order.

The segmented data structure contains a series of token lists, one for each processing element 13(*i*). In the segmented data structure, all of the tokens which have the same record identification are in the same token list. Accordingly, the token list for each processing element 13(*i*) contains all of the tokens which have a particular record identification. Preferably, the number of record identifications assigned to the processing elements 13(*i*) are approximately the same. The segmented data structure is also divided into a series of rows, with each row containing data, representing a token, that will be stored in the same row in the memories 15(*i*) of the processing elements 13(*i*).

The rows in the segmented data structure are further grouped into segments. The tokens in each segment contain tokens that have approximately the same word identification. The segmentation provides a data structure in which the tokens with the same word identification are stored in the same segment, or in adjacent segments, to provide an upper bound on the distances between rows containing tokens for a particular word identification.

After the system generates a segmented data structure, it stores it in the mass data store 17 (step 31). As noted above, each row in the segmented data structure comprises a unit of storage in the mass data store 17.

After the system has generated the segmented data structure, it, in particular the host 10, may receive and process a query (step 32). In that operation, the host 10 first identifies the particular elements of the query. The query comprises identification of one or more query words, and each word may have an associated weight value. The query words and associated weight values may each be provided by an operator or by an application program being processed by the massively parallel computer (FIG. 1). Upon identifying the query words, the host 10 may identify the particular segments and rows associated with the query words in the segmented data structure created in step 30 (step 33) and enable them to be transferred to the processor array 12 (step 34).

Thereafter, the host 10 enables the micro-controller 11 to, in turn, enable the processing elements 13(*i*) in the processor array 12 to perform a series of operations to process the query. The detailed operations performed in connection with processing of a query are will be described below in connection with FIGS. 8A and 8B. Briefly, the micro-controller 11 first enables the processing elements 13(*i*) to establish a query score table (FIG. 6) in their respective memories 15(*i*) (step 35). The query score table includes, for each processing element 13(*i*), a plurality of entries each associated with a record maintained in the list of the segmented data structure associated with the processing element 13(*i*).

After enabling establishment of the query score table, the micro-controller 11 enables the processing elements 13(*i*) to perform a series of iterations, comprising steps 36 through 38, during which they perform a query processing operation in connection with an element of the query and the portion of the segment which they received in step 34 (step 36), and update the entry in their respective entries of the query score table to reflect the results of the query processing operation (step 37). After the query score table has been updated, the host 10 determines whether all of the elements of the query have been processed, and if not returns to step 36 (step 38).

After the host 10 determines in step 38 that all of the elements of the query have been processed, the host 10 may use the query score table to generate a query response (step 39) for use by the operator or applications program which generated the query. For example, the host 10 may generate a response identifying a selected number of records having the highest scores in the respective entries of their query score table. Alternatively, the host 10 may identify all records whose query score table entries contain scores above a selected threshold value.

The query processing system provides a number of advantages. For example, since all the tokens for a record are maintained in the list of the segmented posting file for one processing element 13(*i*), and that processing element 13(*i*) also maintains the query score table entry for that same record, no communications are required among processing elements 13(*i*) during a query processing operation. Instead, for all records, all operations performed during a query processing operations for each of the records are performed on a single processing element 13(*i*). Since essentially no communications are required for a query processing operation, the operation can be performed much faster than in a system, such as described in the aforementioned Stanfill, et al., paper, in which communications among processing elements may be required.

In addition, the segmentation of the posting file provides a substantial advantage. In particular, the segmentation ensures that tokens for a particular word identification are stored in approximately the same rows of the segmented posting file. This file organization simplifies loading of the particular rows of the posting file into the processor array 12 to respond to a particular query.

With this background, the details of the data structures created and used by the query processing system, and details of the operations performed by the query processing system, will be described in connection with FIGS. 3 through 8B. FIG. 3 depicts an original posting file 50 from which the query processing system generates the segmented posting file (FIG. 5). The original posting file 50 may be generated by a data processing system in any conventional manner. Original posting file 50 is effectively a linear array of entries 51A through 51K [generally identified by reference numeral 51(*i*)] each of which stores a token.

Each entry 51(*i*) includes two fields for storing components of a token, including a word identification field 52, which stores a word identification value, and a record identification field 53, which stores a record identification value. The collection of word identification values represent all of the different words which are present in the records; thus, if the same word is present in several records, the instances of the word in the records will be represented by the same word identification value. The tokens are organized in successive entries 51(*i*) according, first, to increasing record identification values, and, second, to increasing word identification values.

Figure 7B:
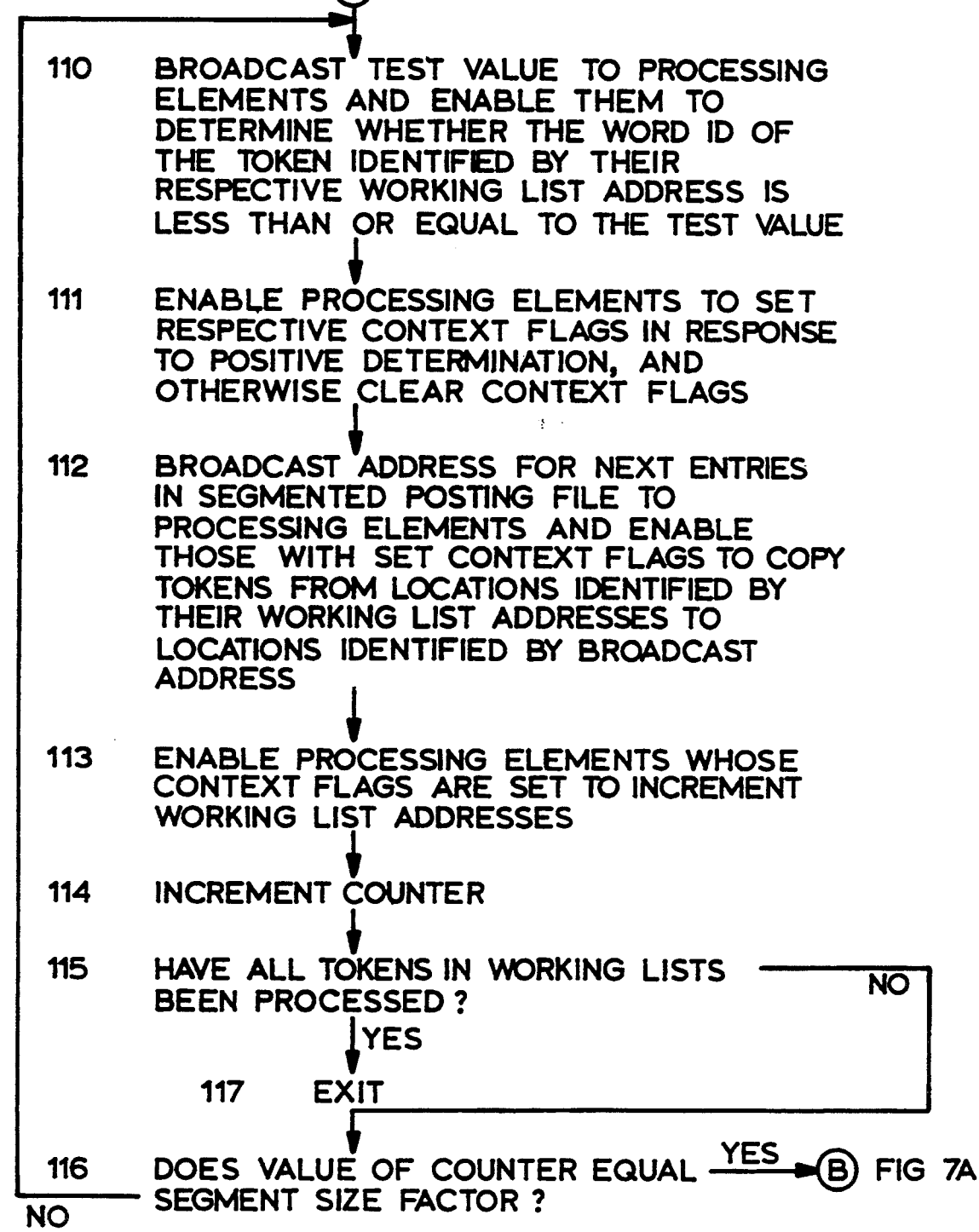

In the creation of a segmented posting file (step 30, FIG. 2; FIGS. 7A, 7B), the query processing system creates an intermediate working list 60, which is depicted in FIG. 4. The intermediate working list includes a plurality of lists 61A through 61M [generally identified by reference numeral 61(*i*)], one for each processing element 13(*i*). If the query processing system uses the processor array 12 to create the segmented working list, each list 61($i$) is maintained in the associated processing element 13($i$). Each list 61($i$) includes a plurality of entries, generally identified by reference numeral 62($i$)($j$) (index "i" identifies the list 61($i$) in which the entry is maintained, and index "j" identifies the entry within the list), each of which stores a token from the original posting file 50 (FIG. 3). Like the entries 51($j$) in the original posting file 50, each entry 62($i$)($j$) includes a field, generally identified by reference numeral 63($i$), which stores a word identification value and a field, generally identified by reference numeral 64($i$), which stores a record identification value.

In the intermediate working list 60, the list 61($i$) for a particular processing element 13($i$) contains all of the tokens which have a particular record identification value. The host 10, in creating the intermediate working list 60, assigns records to the processing elements 13($i$) in any manner, such as in round robin order, and loads the tokens for each record from the entries 51($j$) in the original posting file into the appropriate lists 61($i$) of the intermediate working lists 60. In the successive entries 62($i$)($j$) in each list 61($i$), the tokens are ordered, first, by word identification value, and, second, by record identification value.

It will be appreciated that, since there may be a wide variation in the number of tokens associated with the various records, as identified by the various record identification values, and with the various word, as identified by the various word identification values, there may be a wide variation in the number of entries 62($i$)($j$) in the various lists 61($i$). In addition, since there may be a wide variation in the number of tokens for words, as identified by the various word identification values, associated with each record, the tokens for words in the various lists 61($i$) may be in entries 62($i$)($j$) which have disjoint and perhaps widely separated ranges for index (j). The segmented posting file, identified by reference numeral 70 and depicted in FIG. 5, is established to reduce or minimize this disjunction and separation.

Figure 5:
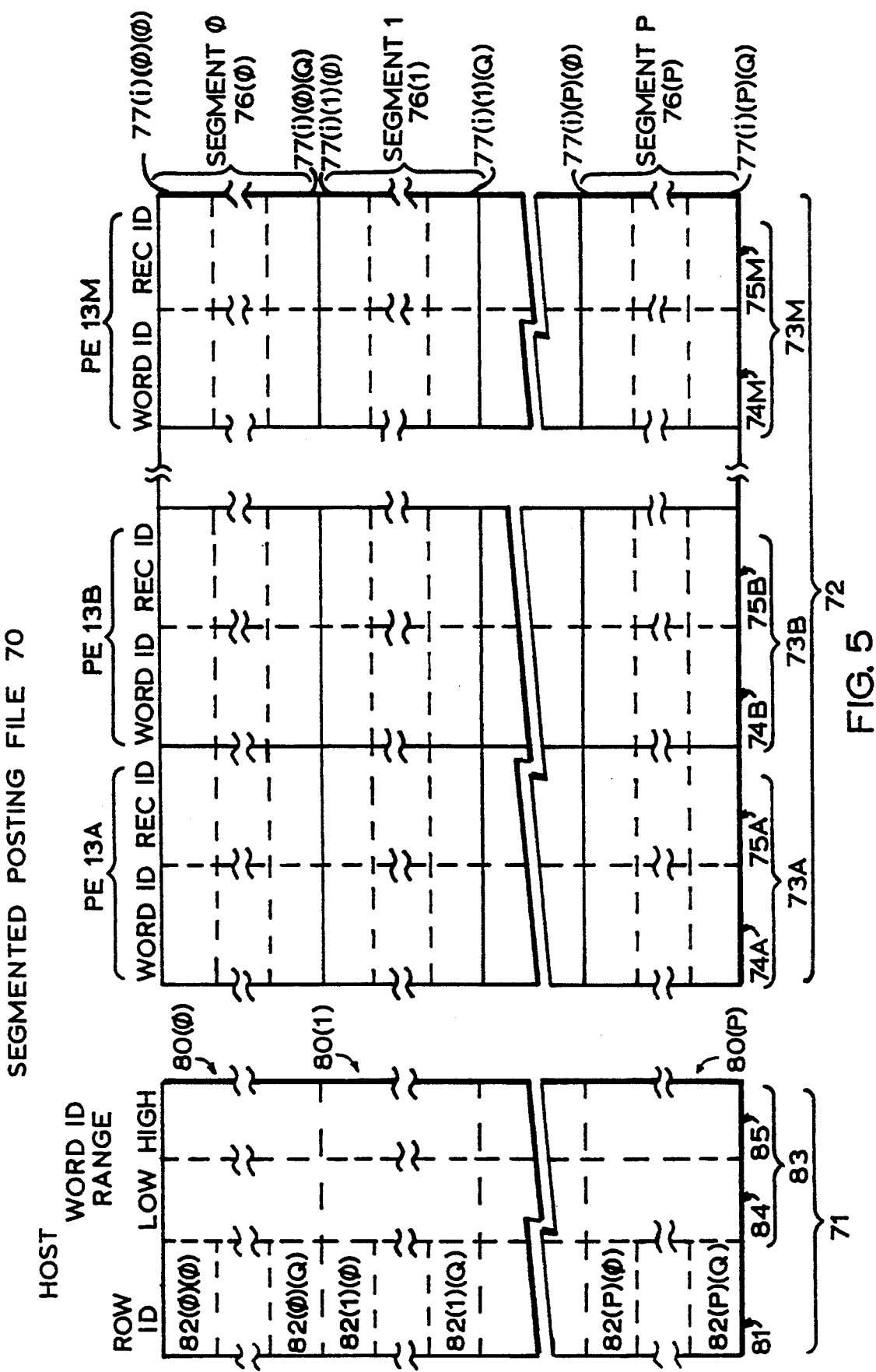

With reference to FIG. 5, the segmented posting file 70 includes two portions, namely a host 10 portion 71 and a PE portion 72. The host 10 portion 71 may be stored and maintained on the host 10, and provides information about the various elements of the PE portion 72 as described below. The PE portion 72 contains information which is processed by the processing elements 13($i$) in response to a query, and is normally stored on the mass data store 17. The PE portion 72 includes a plurality of lists, generally identified by reference numeral 73($i$), each associated with and containing information to be processed by one processing element 13($i$).

Each list 73($i$) in the segmented posting file is divided into a plurality of segments, generally identified by reference numeral 76($j$), with all of the lists 73($i$) containing the same number of segments (P+1 segments in FIG. 5). Each segment includes a plurality of entries, generally identified by reference numeral 77($i$)($j$)($k$), where indices "i" and "j" identify the list 73($i$) and segment 76($j$) containing the entry, and index "k" identifies the entry in the succession of entries within the segment. Each entry 77($i$)($j$)($k$), in turn, includes two fields, including a word identification field 74($i$), which stores a word identification value, and a record identification field 75($i$), which stores a record identification value. As will be made clear below in connection with FIGS. 7A and 7B, which depict operations performed in generating the segmented posting file 70, some of the entries 77($i$)($j$)($k$) may not contain tokens; for those entries that do contain tokens the fields 74 and 75 contain the word identification values and the record identification values for the respective tokens.

The entries 77($i$)($j$)($k$) which have the same values for indices (j)(k) form a single row in the PE portion 72. In one embodiment, the row forms a unit of storage in the mass data store 17, and, during processing of a query request as described below in connection with FIGS. 8A and 8B, the entries 77($i$)($j$)($k$) are stored in the same location in respective memories 15($i$) in the processing elements 13($i$).

The host 10 portion 71 includes a set of segment descriptors generally identified by reference numeral 80($j$). Each segment descriptor 80($j$) includes information about the entries 77($i$)($j$)($k$) in the associated segment 76($j$). In particular, a segment descriptor includes a row identifier list, generally identified by reference numeral 81($j$) which contains a series of entries 82($j$)($k$) pointing to the locations, in mass data store 17, in which the successive rows of the PE portion 72 are stored. In addition, each descriptor 80($j$) includes a word range identifier 83 which includes two fields 84 and 85 identifying the lowest and highest word identification values, respectively, in the associated segment 76($j$). It will be appreciated that the host 10 may use the information in the host 10 portion 71, in particular the word range identifier 83, to identify segments 76($j$) whose tokens contain word identification values appropriate to processing a query request. After identifying the appropriate segments 76($j$), the host 10 may use the row pointers 82($j$)($k$) to identify the locations of the associated rows of the PE portion 72 in the mass data store 17.

As noted above (steps 35 and 37, FIG. 2), the query processing system also makes use of a query score table. A query score table, identified by reference numeral 90, is shown in FIG. 6. With reference to FIG. 6, the query score table includes a plurality of query score lists, generally identified by reference numeral 91($i$), each associated with a processing element 13($i$). The query score lists 91($i$) are established in the memories 15($i$) of the associated processing elements 13($i$). Each query score list 91($i$) includes one or more successive entries 92($i$)($l$), where index "i" identifies the list 91($i$) and index "l" identifies the entry in the succession of entries. Each entry 92($i$)($l$) is associated with a record assigned to the processing element 13($i$), and is used in maintaining a score to reflect the results of a query processing operation (step 37, FIG. 2).

With this background, the operations performed by the query processing system in establishing the segmented posting file 70 will be described in connection with the flow charts in FIGS. 7A and 7B, and the operations performed in using the segmented posting file 70 in processing a query request will be described in connection with the flow charts in FIGS. 8A and 8B. FIGS. 7A and 7B depict the operations performed by the query processing system in connection with segmented posting file generation by the host 10 in combination with the micro-controller 11 and processor array 12. With reference to FIG. 9A, the host 10 first enables the tokens from the entries 51 of the original posting file 50 to be loaded into slots, or successive storage locations, in the processing elements 13($i$) (step 100). In this operation, the host 10 uses the record identification value from field 53 of the token in each entry to identify the processing element 13(*i*) to receive the token.

After the tokens have been distributed among the processing elements 13(*i*), the host 10 enables the processing elements 13(*i*) to order them, first, according to word identification value, and, second, according to record identification value to form the intermediate working lists 60 (step 101). It will be appreciated that, if the tokens in the original posting file 50 are, as described above in connection with FIG. 3, organized, first, according to word identification value and, second, according to record identification value, the tokens will be loaded into the processing elements 13(*i*) in step 100 in the required order and step 101 will not be required. It will further be appreciated that the result of steps 100 and (if necessary) 101 is the intermediate working list 60, with the tokens in each list 60(*i*) being stored in successive slots in the memories 15(*i*) of the processing elements 13(*i*).

After establishing the intermediate working lists 60 in the processing elements 13(*i*), the host 10 selects a segment size factor, which identifies, for each processing element 13(*i*), the number of entries 77(*i*)(*j*)(*k*), and thus the maximum number of tokens, that can be stored in a segment 76(*j*) for each processing element 13(*i*). The host 10 then broadcasts to the processing elements 13(*i*) the base address of the working lists 60, that is, the address of the first entry 62(*i*)(0) in the working lists 60 in the processing elements 13(*i*). It will be appreciated that the base address value is the same for all of the processing elements 13(*i*) (step 103). The processing elements 13(*i*) save the base address value which they receive from the microcontroller 11 as a working list address that they use in further processing as described below. Thereafter, the host enables the processing elements 13(*i*) to initialize respective working list pointers and copy into them the working list address (step 104). At that time, the working list pointer contains the same value as was broadcast to the processing elements 13(*i*) in step 103, and is used in generating criteria for determining whether tokens in entries 62(*i*)(*j*) in the working lists 60 belong in entries 77(*i*)(*j*)(*k*) in particular segments 76(*j*) in the segmented posting file 70.

Following step 104, the host 10 enables the processing elements 13(*i*) to perform a series of iterations to generate sequential segments 76(*j*) in the segmented posting file 70, each iteration, in turn, comprising a series of iterations to generate the entries 77(*i*)(*j*)(*k*) in each segment 76(*j*). In this, the host 10 first initializes a counter which it uses to count iterations in constructing a segment 76(*j*) in the segmented posting file (step 105). The host 10 uses the counter initialized in step 105 to control the generation of entries 77(*i*)(*j*)(*k*) in each segment 76(*j*).

In particular, the host 10 initially enables the processing elements to increment the respective working list pointers, which initially points to the base of the working lists 60, by an amount corresponding to the segment size factor (step 106) to point to a row of entries 62(*i*)(*j*), where "j" corresponds to the segment size factor. The host 10 then enables the processing elements 13(*i*) to perform a "global minimum" operation in connection with the word identifications from the tokens in the entries 62(*i*)(*j*) identified by the respective working list pointers (step 107). The global minimum operation provides a value that is the minimum value, among all processing elements 13(*i*), of the word identifications contained in the entries 62(*i*)(*j*) identified by the working list pointers. The host 10 saves this value as a test value used in connection with establishing the first segment 76(0) in the segmented posting file 70. As will be described below, the test value determined in step 107 places an upper bound on the word identification values of the tokens in the segment 76(*j*) being generated during the iteration.

After step 107, the host 10 enables the processing elements 13(*i*) to perform a series of iterations to establish the tokens in the entries 77(*i*)(0)(*k*) in the first segment 76(0). In each iteration, comprising steps 110 through 116, the host 10 initially broadcasts the test value to the processing elements 13(*i*) and enables them to perform a comparison operation to determine whether the value of the word identification of the token identified by the working list addresses maintained by the respective processing elements 13(*i*) is less than or equal to the test value (step 110). The host 10 enables those processing elements 13(*i*) which have a positive comparison in step 110 to set their respective context flags 18(*i*) (step 111). In addition, in step 111, the host 10 enables those processing elements 13(*i*) which have a negative comparison in step 110, indicating that the value of the word identification of the token identified by the working list addresses maintained by the respective processing elements 13(*i*) is greater than the test value, to clear their respective context flags 18(*i*). The condition of the context flags 18(*i*) in the respective processing elements 13(*i*) controls their processing in steps 112 and 113.

After enabling the processing elements 13(*i*) to condition their respective context flags 18(*i*), the host 10 broadcasts a pointer to the next row of entries 77(*i*)(*j*)(*k*) in the segmented posting file 70 to the processing elements 13(*i*) and enables those processing elements whose context flags 18(*i*) are set to copy the token from the entry 62(*i*)(*j*) of the working lists 60 identified by their respective working list addresses to the entry in the segmented posting file 70 identified by the broadcast address (step 112). Since the operation by a processing element 13(*i*) of step 112 is conditioned on the state of its context flag 18(*i*), the processing element 13(*i*) will only copy the token into the segmented posting file if the token's word identification value is less than the test value broadcast by the host 10.

The host 10 then enables the processing elements 13(*i*) whose context flags 18(*i*) are set to increment their respective working list addresses (step 113). Thus, working list address maintained by each processing elements 13(*i*) points to the next entry 62(*i*)(*j*) in the processing element's list 61(*i*) containing a token to be copied into the segmented posting file 70. Thereafter, the host 10 increments the row counter established in step 105 (step 114), and determines whether all of the tokens in the working lists 60 have been processed (step 115). If not, the host 10 sequences to step 116 to determine whether the value of the row counter equals the segment size factor (step 116). If the host 10 determines, in step 116, that the value of the row counter does not equal the segment size factor, it returns to step 110 to enable creation of another row of entries 77(*i*)(*j*)(*k*) in the same segment 76(*j*).

On the other hand, if the host 10 determines, in step 116, that the size of the row counter equals the segment size factor, it has completed iterations relating to creation of a particular segment 76(*j*), and it returns to step 104 to initiate another iteration for creating the next segment 76(*j*+1). In that iteration, the host 10, in steps 104 through 107, identifies a new test value to be used by the processing elements 13($i$) in determining whether particular tokens in the intermediate working file are to be copied into the segmented posting file 70.

In particular, in step 104 the host enables the processing elements 13($i$) to copy their respective working list addresses, as was last established during step 113, into their respective working list pointers. The host 10 enables the processing elements 13($i$) to increment the respective working list pointers in step 106 by the segment size factor value to point to new tokens in the intermediate working file to be used in the global minimum operation to determine the new test value. Thus, the particular entry 62($i$)($j$) in the working lists 60 used by a processing element 13($i$) in the global minimum operation will depend upon the working list address of the last entry 62($i$)($j$) used thereby in processing step 113. Thereafter, the host 10 again enables the processing elements 13($i$) to perform steps 110 through 116 to generate a new segment 76($j$).

Thus, the host 10 iteratively performs a series of iterations of steps 110 through 116, under control of the row counter, to generate successive segments 76($j$). At some point in processing of step 115, the host 10 will determine that it has processed all of the tokens in the working lists 60, and will exit (step 117). At that point, it may establish the host portion 71 of the segmented posting file 70, and may enable the processor array 12 to store the just-created PE portion 72 of the segmented posting file 70 in the mass data store 17.

It will be appreciated that, in the segmented posting file 70 generated as described above, one or more of the entries 77($i$)($j$)($k$) in some of the segments 76($j$), for some of the lists 73($i$), will be empty. While that reduces the density in which tokens can be stored, it also permits a reduction in the variation in rows of tokens having the same word identification values from that provided by the intermediate working list 60. This can be advantageous during processing of a query request, as described below in connection with FIGS. 8A and 8B.

Figure 8A:
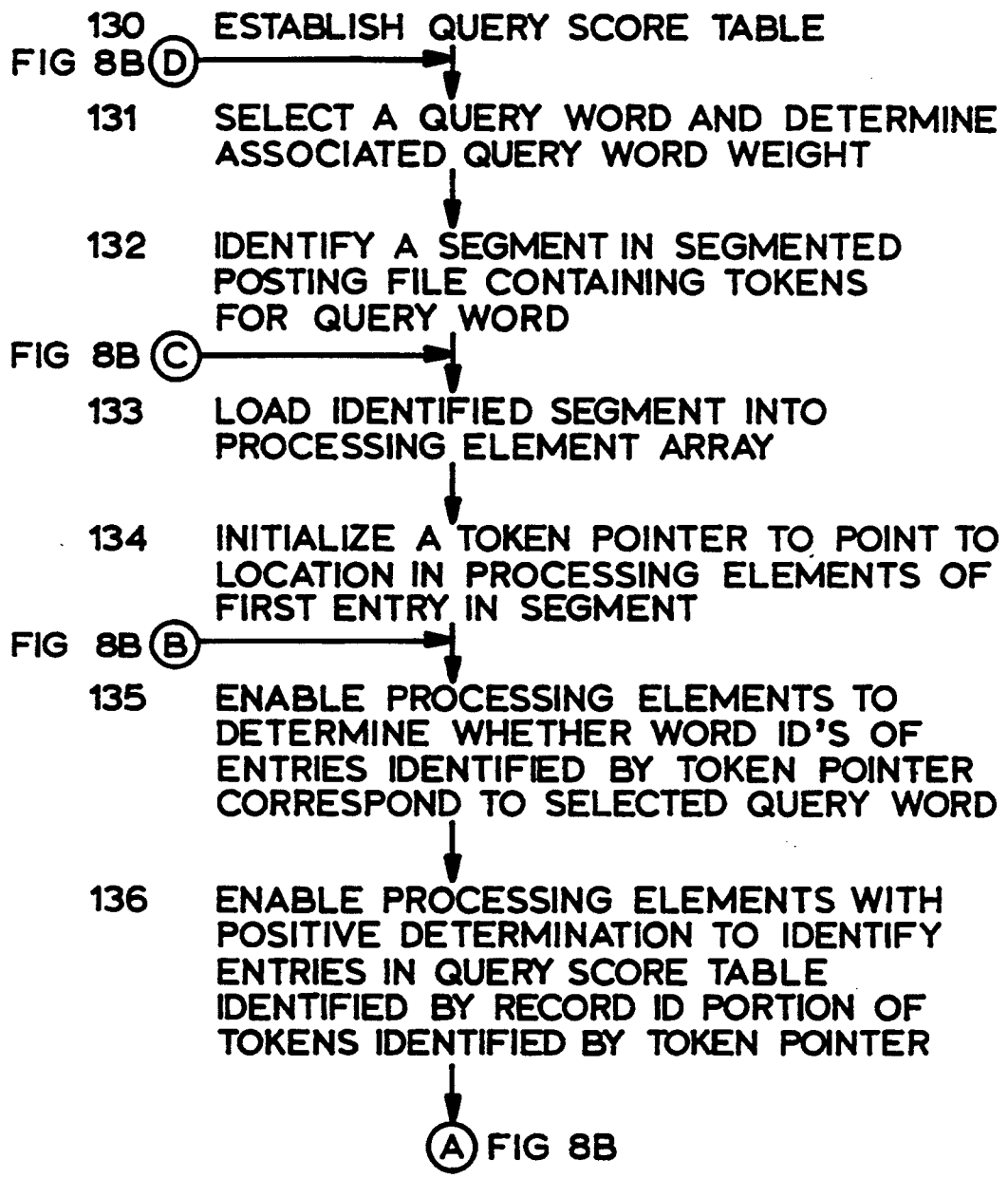
FIGS. 8A and 8B together comprise a flow diagram depicting operations performed by the new query processing system in using the segmented posting file and query score table, depicted in FIGS. 5 and 8, respectively, in processing a query.
Figure 8B:
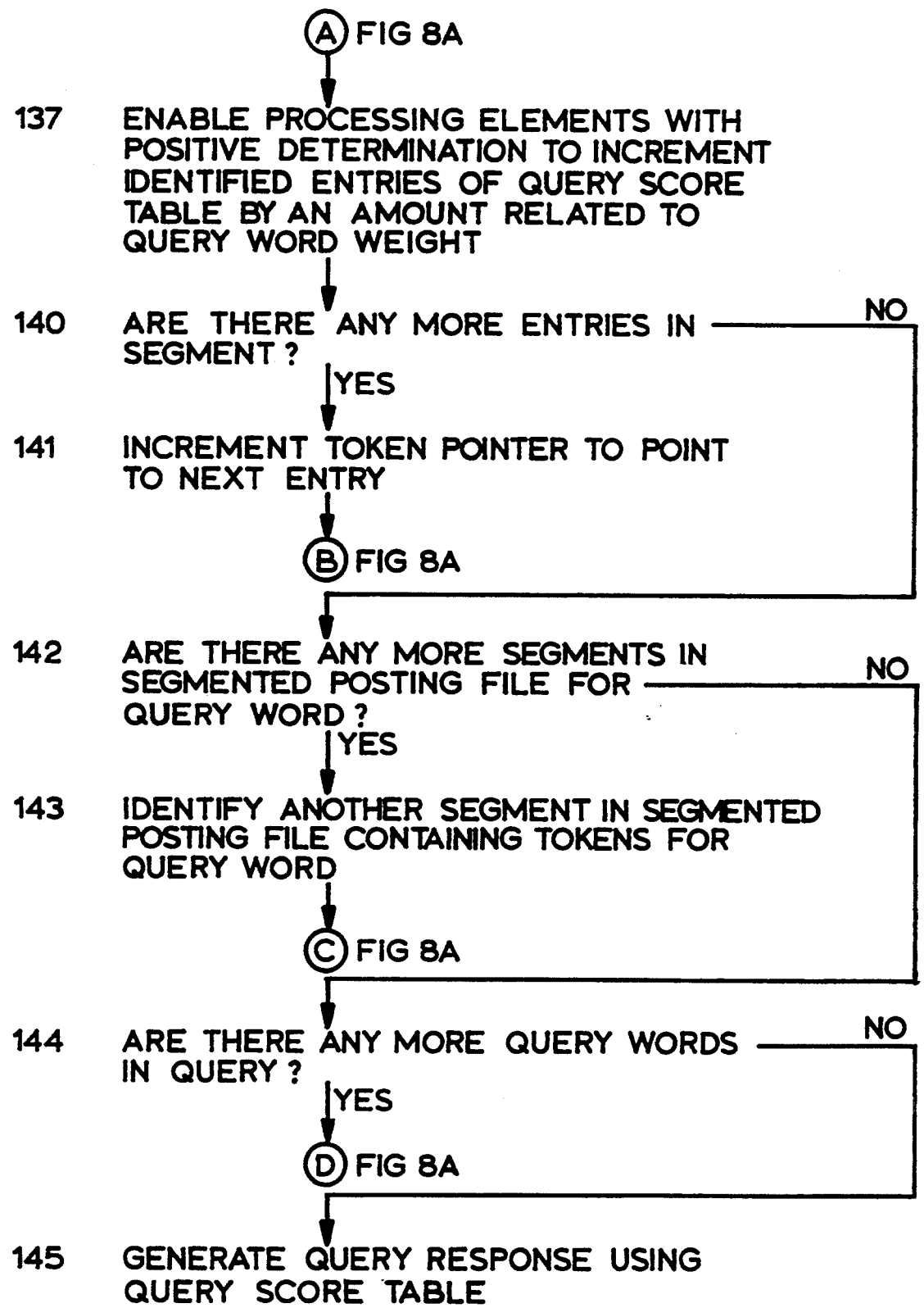

With reference to FIG. 8A, in responding to a query request, the host 10 first enables the processing elements 13($i$) to establish a query score table 90 (step 130) in their respective memories 15($i$). As described above, in enabling establishment of the query score table, the host 10 enables the processing elements 13($i$) to establish, in parallel, an entry 92($i$)($l$) for each record assigned thereto.

As noted above, each query request comprises one or more query words, and each query words may have an associated weighting value. The host 10 and processing elements 13($i$) process the query request a query word at a time. The host 10 enables the processing of each query word in one or more iterations. During the iterations, the host 10 enables processing of the rows in the segmented posting file 70 containing an entry 77($i$)($j$)($k$) containing a token whose word identification field 74($i$) contains a value that matches the query word. After processing all of the query words in this manner, the host 10 enables generation of a query response.

More specifically, after identifying the query words in the query request, the host 10 selects the first word in the query request and uses the host 10 portion 71 of the segmented posting file to identify the segment(s) containing tokens whose word identification values match the selected query word (step 132). In this operation, the host 10 can scan the word range identifiers 83 in the descriptors 80($j$) in the host 10 portion 71. When the host 10 locates a descriptor 80($j$) whose word range identifier 83 defines a range including the selected query word, it uses the entries 82($j$)($k$) in the row identifier list 81($j$) to identify the locations in the mass data store 17. It will be appreciated that the identified locations are those of the segment 76($j$) containing tokens with the required word identification values. Thereafter, the host 10 enables the entries 77($i$)($j$)($k$) in the segments 76($j$) in the identified locations in the mass data store 17 to be transferred to the appropriate processing elements 13($i$) (step 133).

The host 10 then initializes a token pointer to point to the location of the first entries 77($i$)($j$)($k$) in the memories 15($i$) of the processing elements 13($i$) (step 134). The host 10 enable the processing elements 13($i$) to compare the word identification values in fields 74($i$) of the tokens in the respective entries 77($i$)($j$)($k$) to determine whether they correspond to the selected query word (step 135). The host 10 enables the processing elements 13($i$) with a positive determination in step 135 to identify the entries 92($i$)($l$) in the query score table 90 identified by the record identification fields 75($i$) of the same tokens (step 136) and to increment the contents of the identified entries 92($i$)($l$) (step 137). In that operation, the weight associated with the query word is used in determining the amount of incrementation.

The host 10 then determines whether all of the entries 77($i$)($j$)($k$) in the segment 76($j$) have been processed (step 140) and if not, it increments the token pointer to point to the next entry 77($i$)($j$)($k$) in the processing elements 13($i$) and returns to step 135 to process the next entry. The host 10 thus iteratively enables the processing elements 13($i$) to process, in parallel, respective entries 77($i$)($j$)($k$) in the segment 76($j$), the number of iterations corresponding to the maximum number of entries 77($i$)($j$)($k$) for each processing element 13($i$) in the segment 76($j$) that contains tokens.

If the host 10 determines, in step 140, that all of the entries 77($i$)($j$)($k$) in the segment 76($j$) have been processed, it sequences to step 142. In that step, the host 10 further scans the descriptors 80($j$) in the host 10 portion 71 to determine whether the segmented posting file 70 contains any further segments 76($j$) which contain entries 77($i$)($j$)($k$) with tokens which, in respective fields 74($i$), contain word identification values that correspond to the selected query word. If so, it identifies the segment 76($j$) (step 143) and returns to step 133 to process the segment, as described above.

If the host 10 determines, in step 142, that there are no additional segments, it sequences to step 144 to determine whether the query request contains any additional query words. If so, the host 10 sequences to step 131 to select another query word in the query request and process it as described above. Finally, if the host 10 determines, in step 144, that there are no further query words in the query request, is uses the query score table 90 to generate a query response, which it may return to the operator or to an applications program which provided the query request.

Figure 9B:
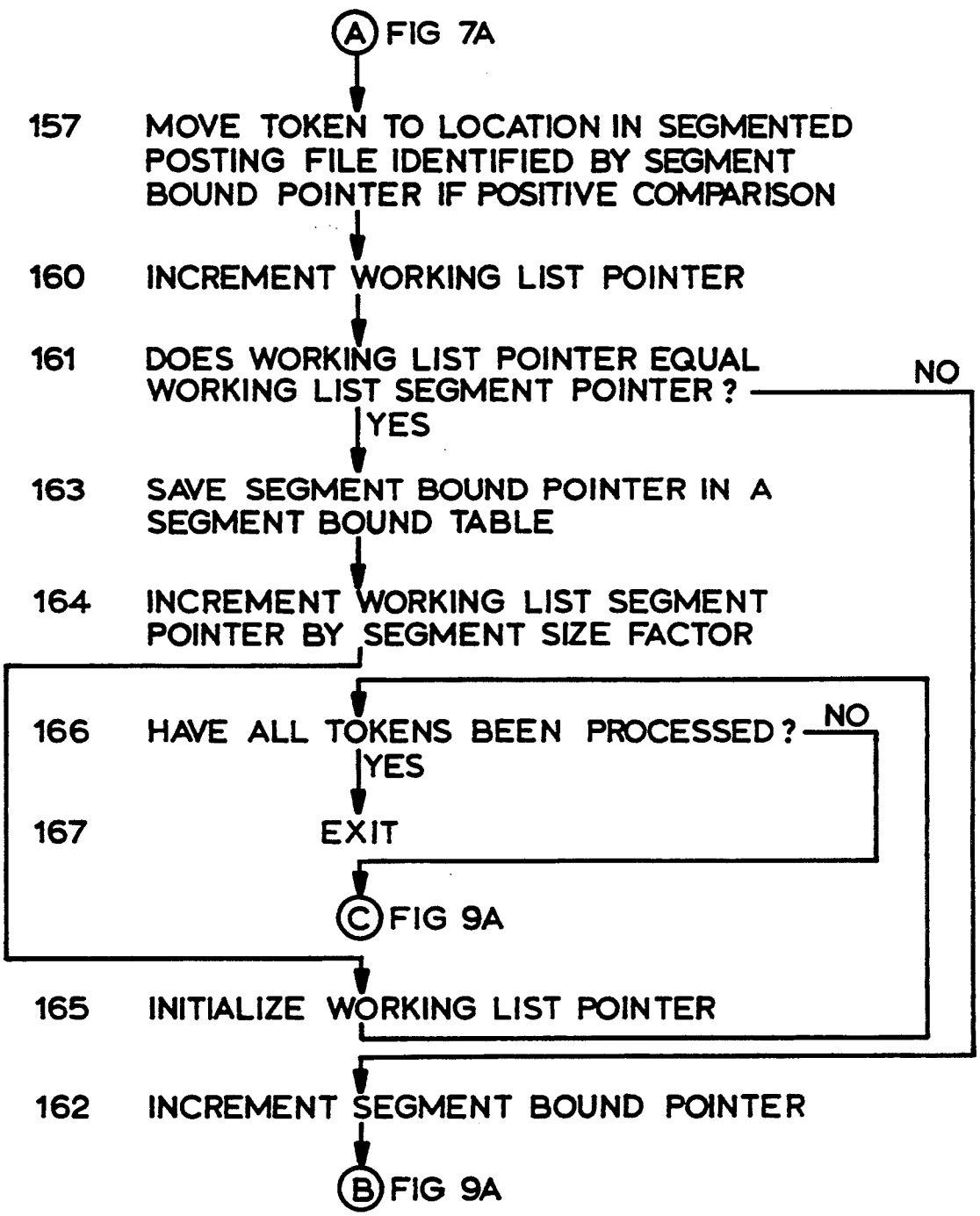

FIGS. 9A and 9B depict the operations performed by a second embodiment of the query processing system in connection with segmented posting file generation by the host 10 in combination with the micro-controller 11 and processor array 12. In the embodiment described in connection with FIGS. 9A and 9B, the processing elements do not need to maintain working list addresses, as is required in the embodiment described in connection with FIGS. 7A and 7B. Instead, as described below, the host 10 provides all addresses used in identifying the entries 62(i)(j) in the working lists 60 and in constructing the segmented posting file 70.

With reference to FIG. 9A, the host 10 first enables the tokens from the entries 51 of the original posting file 50 to be loaded into slots, or successive storage locations, in the processing elements 13(i) (step 150). In this operation, the host 10 uses the record identification value from field 53 of the token in each entry to identify the processing element 13(i) to receive the token. After the tokens have been distributed among the processing elements 13(i), the host 10 enables the processing elements 13(i) to order them, first, according to word identification value, and, second, according to record identification value to form the intermediate working lists 60 (step 151). It will be appreciated that, if the tokens in the original posting file 50 are, as described above in connection with FIG. 3, organized, first, according to word identification value and, second, according to record identification value, the tokens will be loaded into the processing elements 13(i) in step 150 in the required order and step 151 will not be required. It will further be appreciated that the result of steps 150 and (if necessary) 151 is the intermediate working list 60, with the tokens in each list 60(i) being stored in successive slots in the memories 15(i) of the processing elements 13(i).

Thereafter, the host 10 initializes three pointers, namely, a working list pointer, a segment pointer and a segment bound pointer, and a segment bound table, which are used in generating the segmented posting file 70 (step 152). Briefly, the host 10 enables generation of the segmented posting table in a series of iterations, and the host 10 uses the working list pointer to identify successive slots forming the lists 61(i) during an iteration. During the successive iterations, the host 10 advances the last slot in each list 61(i) to be processed by an amount determined by a segment size factor. The host 10 uses the segment bound pointer to point to successive rows of the segmented posting file 70 as the file 70 is being generated. When the host 10 has finished enabling generation of a segment 76(j) in the segmented posting file 70, it stores the value of the segment bound pointer in the segment bound table. Thus, the successive entries in the segment bound table identify the last rows in each segment 76(j) in the segmented posting file 70.

More specifically, after establishing the aforementioned pointers and the segment bound table, the host 10 selects a value for the segment size factor (step 153). The host 10 then begins a series of iterations to enable the processing elements 13(i) to identify tokens in their respective lists 61(i) of the intermediate working lists 60 to be assigned to successive segments in the segmented posting file 70.

Initially, the host 10 increments the working list segment pointer by the value of the segment size factor (step 154) and enables all of the processing elements 13(i) to, in parallel, identify the smallest word identification value in the tokens in the slots of the processing elements 13(i) identified by the working list segment pointer. The host 10 saves the identified value as a test value (step 155), which is used as a maximum bound on the word identification values stored in the 76(j) in the segmented posting table 70 (steps 156, et seq.) during the iteration.

After determining the test value in step 155, the host 10 enables the processing elements 13(i) to, in parallel, compare the value of the word identification value of the tokens in their slots identified by the working list pointer (step 156). If a processing element 13(i) determines, in step 156, that the word identification value of the token is less than or equal to the test value, it sequences to step 157 in which it moves the token to a location in its memory 15(i) pointed to by the segment bound pointer (step 157). That location forms an entry 77(i)(j)(k) in that processing element's list 73(i). If a processing element 13(i) determines that the word identification value of the token is greater than the test value, it skips step 157.

After step 157, the host 10 increments the working list pointer (step 160) and determines whether the working list pointer and the working list segment pointer have the same value (step 161). If so, the host 10 has finished an iteration and has enabling generation of one segment 76(j) in the segment posting file 70. On the other hand, if the host 10 determines that it has not finished an iteration, it increments the segment bound pointer, to point to slots for new entries in the PE portion 72 of the segmented posting file 70 (step 162). The host 10 then returns to step 156 to enable the processing elements 13(i) to process the tokens in the next slots in their respective working lists 61(i), that is, the slots identified by the working list pointer.

On the other hand, it the host 10 determines, in step 161, that the working list pointer and the working list segment pointer have the same value, it sequences to step 163 in which it saves the segment bound pointer in the segment bound table and performs some housekeeping operations to prepare for the next iteration. In particular, the host 10 increments the working list segment pointer by the value of the segment size factor (step 164), initializes the working list pointer (step 165) and sequences to step 155 to begin the next iteration.

The host 10 enables the processing elements 13(i) to perform one or more iterations, as described above. At some point, it will determine, in step 166, that all of the tokens in the intermediate working lists have been processed. In that case, it sequences to step 167, in which it exits. Prior to exiting, the host 10 may, for example, generate the host 10 portion 71 of the segmented posting file, using the segment bound table to, for example, generate the descriptors 80(j). The host 10 may also enable the segmented posting file 70 to be stored in appropriate locations, enabling, for example, the PE portion 72 to be stored in the mass data store.

The new query processing system provides a number of advantages. In particular, since all the tokens for a record are maintained in the list of the segmented posting file for one processing element 13(i), and since that same processing element 13(i) also maintains the query score table entry for that same record, no communications are required among processing elements 13(i) during a query processing operation. All operations performed during a query processing operations for each of the records are performed on a single processing element 13(i). Since essentially no communications are required for a query processing operation, the operation can be performed much faster than in a system, in which communications among processing elements may be required.

In addition, the segmentation of the posting file ensures that tokens for a particular word identification are stored in approximately the same rows of the segmented posting file. This file organization simplifies loading of the particular rows of the posting file into the processor array 12 to respond to a particular query, and may also reduce the number of rows that need to be processed to respond to the query.

It will be appreciated that the a number of variations and modifications may be made to the query processing system as described above. For example, each token stored in an entry 77(i)(j)(k) in the segmented posting file 70 may include, in addition to a word identification value in field 74(i) and a record identifier in field 75(i), a token weight value. The token weight value may be a function of the number of times the corresponding word appears in the record, or of the importance of the word in the subject matter of the record, and so forth. In incrementing the respective entries 92(i)(l) in the query score table 90 (step 137), host 10 may enable the processing elements to use the token weight value, as well as the weight value from the query request.

In addition, the tokens may have such additional information as the location in the record(s) of the respective words, and the host 10 may enable the processing elements 13(i) to perform operations in connection with this information in steps 135 through 137. For example, the query processing system may process query requests requesting identification of records in which the query words are proximate each other to a selected degree, and the host 10 may enable the processing elements to use the location information in generating an incrementation value (step 137).

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A segmented posting file generating system for generating a segmented posting file in response to a record base comprising a plurality of the record base entries represented by an array comprising a plurality of columns and rows, the entries within each column having an order according to their respective word identifiers, the segmented posting file generating system generating said segmented posting file in a series of segment generation iteration, the segmented posting file generating system comprising:
   A. a computer for performing processing operations in response to commands;
   B. a segmented posting file generation control including:
      i. a segment word value identifier determination portion for providing commands to enable said computer to
         (a) select, for each segment generation iteration, an entry in each column of said record base as a segment word value determiner entry, and
         (b) identify as a segment word value identifier range value a value having a selected value relation to the word identifier values in the segment word value determiner entries; and
      ii. a segment establishment portion for, during each segment generation iteration, providing commands to enable said computer to generate a series of rows of the segmented posting file in each of a series of segment row generation iterations, the commands enabling the computer to, for each column of the record base
         (a) determined whether, a record base entry of the column of the record base contains a word identifier having a value having a selected relation to the segment word identifier determination value and
         (b) in response to a positive determination, copy the entry in the record base to the entry in a corresponding column of the segmented posting file and select the next entry of the record base for the next segment row generation iteration.

2. A segmented posting file generating system as defined in claim 1 in which the number of rows in a segment in the segmented posting file corresponds to a segment size factor,
   A. the segmented posting file generation control further including a record base entry identifier establishment portion for providing commands to enable said computer to establish a record base entry identifier for each column of the record base, and a segment entry pointer establishment portion for providing commands to enable said computer to establish a segment entry pointer;
   B. the segment word value identifier determination portion providing commands to enable said computer to use the record base entry identifiers for the columns of the record base to select from each column of the record base a record base entry as the segment determiner entry, the segment word identifier determination portion further providing commands to enable the computer to identify as a segment word identifier determiner value the minimum of the word identifier values in the segment determiner entries; and
   C. the segment establishment portion providing commands to enable said computer during each iteration to use the segment entry pointer to establish each successive row in a segment of said segmented posting file.

3. A segmented posting file generating system as defined in claim 2 in which, for each segment generation iteration, the segment word value identifier determination portion generates commands to enable said computer to use, as the segment word value determiner entry for each column, a record base entry identified by the sum of the record base entry identifier for the column and the segment size factor.

4. A query processing system for processing queries in connection with a record base including a plurality of record base entries each of which includes a record identifier and a word identifier, each query containing at least one query word, the query processing system identifying records having a selected relationship between the query and the word identifiers contained in the record base, said query processing system comprising:
   A. a plurality of processing elements, each for performing processing operations in response to commands;
   B. a control arrangement including:
      i. a segmented posting file generation control portion for providing commands to enable said processing elements to generate, in response to said record base, a segmented posting file, said segmented posting file having a plurality of segmented posting file entries, at least some of said segmented posting file entries having a word identifier and a record identifier, said segmented posting file entries being represented by an array comprising a plurality of columns and rows, said rows being aggregated into segments each having a selected number of rows with each segment containing entries having word identifiers within an identified word identifier range, the segmented posting file generation control portion generating commands so as to enable said processing elements to generate the columns of said segmented posting file in parallel; and ii. a query processing control portion for providing, in a series of iterations each with respect to a query word in the query, commands to enable said processing elements to, in parallel:

(a) receive respective portions of columns comprising a segment of the segmented posting file associated with the word identifier range containing the query word, each processing element receiving said portion of one of said columns, (b) identify entries in the segment whose word identifiers correspond to the query word, and (c) modify a score maintained for the record identified in the identified entry, the records having a selected score at the end of the series of iterations being determined to have the selected relationship to the query.

5. A query processing system as defined in claim 4 further comprising a mass storage system for storing data, said mass storage system being connected to said processing elements and said control arrangement, A. said segmented posting file generation control portion enabling said processing elements to transfer said segmented posting file to said mass storage system for storage, and B. said query processing control portion enabling said mass storage system to, during each iteration, transfer the segment of said segmented posting file associated with the query word to said processing elements.

6. A query processing system as defined in claim 4 in which, in said record base, the record base entries are represented by an array comprising a plurality of columns and rows, the entries within each column having an order according to their respective word identifiers, the segmented posting file generation control portion enabling said processing elements to establish the segmented posting file in response to the record base in a series of segment generation iterations, the segmented posting file generation control portion including:

A. segment word value identifier determination portion for providing commands to enable said processing elements to, in parallel, i. select for the segment generation iteration a record base entry in respective associated columns of said record base as a segment word value determiner entry, and ii. identify as a segment word value identifier range value a value having a selected value relation to the word identifier values in the segment word value determiner entries of all of said processing elements; and B. a segment establishment portion for, during each of said segment generation iterations, providing commands to enable said processing elements to, in parallel, generate a series of rows of the segmented posting file in a series of segment row generation iterations, the commands during each segment row generation iteration enabling the processing elements to:

i. for each row of the segment, determine whether an a respective record base entry of the record base contains a word identifier having a value having a selected value relation to the segment word value identifier determination value and ii. in response to a positive determination, copy the record base entry to the segmented posting file entry of the segmented posting file and selecting the next record base entry of the record base for the next segment row generation iteration.

7. A query processing system as defined in claim 6 in which the number of rows in a segment in the segmented posting file corresponds to a segment size factor, A. the segmented posting file generation control portion further including a record base entry identifier establishment portion for providing commands to enable said processing elements to, in parallel, establish respective record base entry identifiers, and a segment entry pointer establishment portion for providing commands to enable said processing elements to, in parallel, establish respective segment entry pointers;

B. the segment word value identifier determination portion for providing commands to enable said processing elements to, in parallel, use the respective record base entry identifiers in the selection of the segment word value determiner entry, the segment word value identifier determination portion further providing commands to enable the processing elements to identify as a segment word value identifier determiner value the minimum of the word identifier values in the segment word value determiner entry of all of said processing elements; and C. the segment establishment portion provides commands to enable said processing elements during each segment row generation iteration to, in parallel, use the respective segment entry pointers to establish segmented posting file entries in each successive row in a segment of said segmented posting file.

8. A query processing system as defined in claim 7 further comprising a mass storage system for storing data and a host, both said mass storage system and said host being connected to said processing elements, said host generating storage control commands for controlling:

A. the transfer of said segmented posting file from said processing elements, after generation in response to commands provided by said segmented posting file generation control portion, to said mass storage system for storage; and B. the transfer of segments of said segmented posting file from said mass storage system to said processing elements for processing in response to commands provided by said query processing control portion.

9. A query processing system as defined in claim 8 in which said host further operates in response to commands, said segmented posting file generation control portion further providing commands for enabling said host to establish a host segmented posting file portion having a plurality of entries each associated with a segment of said segmented posting file and identifying for the associated segment the range of word identifier values of the entries in the segment.

10. A query processing system as defined in claim 9 in which the query processing control portion further provides commands to said host to enable it to, for each word of the query, use the host segmented posting file portion to identify a segment which contains word identifier values corresponding to the word of the query, the host enabling the identified segment to be transferred from the mass storage system to the processing elements.

11. A query processing system as defined in claim 7 in which, for each segment generation iteration, the segment word value identifier determination portion generates commands to enable said processing elements to use, as their respective segment word value determiner entries, a record base entry identified by the sum of their respective record base entry identifiers and the segment size factor.

12. A query processing system as defined in claim 4 in which said query processing control portion includes:
A. a score table establishment portion for providing commands to enable said processing elements to, in parallel, establish a score table having a plurality of entries each for receiving a score, each score table entry being associated with a record identified in segmented posting file entries comprising a column of the segmented posting file associated with a respective processing element, and
B. a score processing portion for, in a series of score generation iterations each with respect to a query word of the query, generating commands to enable the processing elements to, in parallel:
i. receive respective segmented posting file entries of the associated columns comprising a segment of the segmented posting file associated with the word identifier range containing the query word, and
ii. iteratively identify segmented posting file entries in the segment whose word identifiers correspond to the query word and modify the score in the score table entry maintained for the record identified in the identified segmented posting file entry,
the records associated with score table entries containing a selected score at the end of the series of score generation iterations being determined to have the selected relationship to the query.

13. A query processing system as defined in claim 12 further comprising a mass storage system for storing data and a host, both said mass storage system and host being connected to said processing elements, said host generating storage control commands for controlling the transfer of segments of said segmented posting file from said mass storage system to said processing elements for processing in response to commands provided by said query processing control portion.

14. A segmented posting file generating system for generating a segmented posting file in response to a record base comprising a plurality of record base entries represented by an array comprising a plurality of columns and rows, the entries within each column having an order according to their respective word identifiers, the segmented posting file generating system enabling said processing elements to establish the segmented posting file in response to the record base in a series of segment generation iterations, the segmented posting file generating system comprising:

A. a plurality of processing elements, each for performing processing operations in response to commands;
B. a segmented posting file generation control including:
i. a segment word value identifier determination portion for providing commands to enable said processing elements to, in parallel,
(a) select for an entry in said record base as a segment word value determiner entry, and
(b) identify as a segment word value identifier range value a value having a selected value relation to the word identifier values in the segment word value determiner entries of all of said processing elements; and
ii. a segment establishment portion for, during each of said segment generation iterations, providing commands to enable said processing elements to, in parallel, generate a series of rows of the segmented posting file in each of a series of segment row generation iterations, the commands enabling the processing elements to
(a) determine whether a record base entry of the record base contains a word identifier having a value having a selected value relation to the segment word value identifier determination value, and
(b) in response to a positive determination, copy the record base entry to the segmented posting file entry in the respective column of the segmented posting file and select the next entry of the record base for the next segment row generation iteration.

15. A segmented posting file generating system as defined in claim 14 in which the number of rows in a segment in the segmented posting file corresponds to a segment size factor,
A. the segmented posting file generation control further including a record base entry identifier establishment portion for providing commands to enable said processing elements to, in parallel, establish respective record base entry identifiers, and a segment entry pointer establishment portion for providing commands to enable said processing elements to, in parallel, establish respective entries in said segmented posting file;
B. the segment word value identifier determination portion providing commands to enable said processing elements to, in parallel, use their respective record base entry identifiers in the selection of the segment value determiner entry, the segment word value identifier determination portion further providing commands to enable the processing elements to identify as a segment word identifier determiner value the minimum of the word identifier values in the segment word value determiner entries of all of said processing elements; and
C. the segment establishment portion provides commands to enable said processing elements during each iteration to, in parallel, use their respective segment entry pointers to establish a segmented posting file entry in each successive row in a segment of said segmented posting file.

16. A segmented posting file generating system as defined in claim 15 in which, for each segment generation iteration, the segment word value identifier determination portion generates commands to enable said processing elements to use, as their respective segment word value determiner entries, a record base entry identified by the sum of their respective record base entry identifiers and the segment size factor.

17. A control arrangement for generating commands for controlling a plurality of processing elements to facilitate the processing of queries in connection with a record base including a plurality of record base entries each of which includes a record identifier and a word identifier, each query containing at least one query word, the query processing system identifying records having a selected relationship between the query and the word identifiers contained in the record base, said control arrangement including:

A. a segmented posting file generation control portion for providing commands to enable said processing elements to generate, in response to said record base, a segmented posting file, said segmented posting file having a plurality of segmented posting file entries, at least some of said segmented posting file entries having a word identifier and a record identifier, said segmented posting file entries being represented by an array comprising a plurality of columns and rows, said rows being aggregated into segments each having a selected number of rows with each segment containing segmented posting file entries having word identifiers within an identified word identifier range, the segmented posting file generation control portion generating commands so as to enable said processing elements to generate the columns of said segmented posting file in parallel; and B. a query processing control portion for providing, in a series of iterations each with respect to a query word in the query, commands to enable said processing elements to, in parallel:
 (i) receive respective portions of columns comprising a segment of the segmented posting file associated with the word identifier range containing the query word, each processing element receiving said portion of one of said columns,
 (ii) identify entries in the segment whose word identifiers correspond to the query word, and
 (iii) modify a score maintained for the record identified in the identified entry, records having a selected score at the end of the series of iterations being determined to have the selected relationship to the query.

18. A control arrangement as defined in claim 17 in which, in said record base, the record base entries are represented by an array comprising a plurality of columns and rows, the entries within each column having an order according to their respective word identifiers, the segmented posting file generation control portion enabling said processing elements to establish the segmented posting file in response to the record base in a series of segment generation iterations, the segmented posting file generation control portion including:

A. a segment word value identifier determination portion for providing commands to enable said processing elements to, in parallel,
 i. select for the segment generation iteration a record base entry in respective associated columns of said record base as a segment word value determiner entry, and
 ii. identify as a segment word value identifier range value a value having a selected value relation to the word identifier values in the segment word value determiner entries of all of said processing elements; and B. a segment establishment portion for, during each of said segment generation iterations, providing commands to enable said processing elements to, in parallel, generate a series of rows of the segmented posting file in a series of segment row generation iterations, the commands enabling the processing elements to
 i. for each row of the segment determine whether a respective record base entry of the record base contains a word identifier having a value having a selected value relation to the segment word value identifier determination value, and
 ii. in response to a positive determination, copy the record base entry to the segmented posting file entry of the segmented posting file and select the next record base entry of the record base for the next segment row generation iteration.

19. A control arrangement as defined in claim 18 in which the number of rows in a segment in the segmented posting file corresponds to a segment size factor, A. the segmented posting file generation control portion further including a record base entry identifier establishment portion for providing commands to enable said processing elements to, in parallel, establish respective record base entry identifiers, and a segment entry pointer establishment portion for providing commands to enable said processing elements to, in parallel, establish respective segment entry pointers;

B. the segment word value identifier determination portion for providing commands to enable said processing elements to, in parallel, use their respective record base entry identifiers in the selection of the segment word value determiner entry, the segment word value identifier determination portion further providing commands to enable the processing elements to identify as a segment word value identifier determiner value the minimum of the word identifier values in the segment word value determiner entries of all of said processing elements; and C. the segment establishment portion provides commands to enable said processing elements during each iteration to, in parallel, use the respective segment entry pointers to establish segmented posting file entries in each successive row in a segment of said segmented posting file.

20. A control arrangement as defined in claim 19, in which the commands further control a mass storage system for storing data and a host, both said mass storage system and said host being connected to said processing elements, said control arrangement further including a storage control command generating portion for providing commands for controlling:

A. the transfer of said segmented posting file from said processing elements, after generation in response to commands provided by said segmented posting file generation control portion, to said mass storage system for storage; and B. The transfer of segments of said segmented posting file from said mass storage system to said processing elements for processing in response to commands provided by said query processing control portion.

21. A control arrangement as defined in claim 20 in which said segmented posting file generation control portion further provides commands for enabling said host to establish a host segmented posting file portion having a plurality of entries each associated with a segment of said segmented posting file and identifying for the associated segment the range of word identifier values of the entries in the segment.

22. A control arrangement as defined in claim 21 in which the query processing control portion further provides commands to said host to enable it to, for each word of the query, use the host segmented posting file portion to identify a segment which contains word identifier values corresponding to the word of the query, the host enabling the identified segment to be transferred from the mass storage system to the processing elements.

23. A control arrangement as defined in claim 19 in which, for each segment generation iteration, the segment word value identifier determination portion generates commands to enable said processing elements to use, as their respective segment word value determiner entries, a record base entry identified by the sum of their respective record base entry identifiers and the segment size factor.

24. A control arrangement as defined in claim 17 in which said query processing control portion includes:
A. a score table establishment portion for providing commands to enable said processing elements to, in parallel, establish a score table having a plurality of entries each for receiving a score, each score table entry being associated with a record identified in segmented posting file entries comprising a column of the segmented posting file associated with a respective processing element; and
B. a score processing portion for, in a series of iterations each with respect to a query word of the query, generating commands to enable the processing elements to, in parallel:
  i. receive respective segmented posting file entries of the associated columns comprising a segment of the segmented posting file associated with the word identifier range containing the query word, and
  ii. iteratively identify segmented posting file entries in the segment whose word identifiers correspond to the query word and modify the score in the score table entry maintained for the record identified in the identified segmented posting file entry,
the records associated with score table entries containing a selected score at the end of the series of iterations being determined to have the selected relationship to the query.

25. A control arrangement as defined in claim 24 further including a storage control portion for providing storage control commands for controlling a mass storage system for storing data and a host, both said mass storage system and said host being connected to said processing elements, said storage control commands controlling the transfer of segments of said segmented posting file from said mass storage system to said processing elements for processing in response to commands provided by said query processing control portion.

26. A method of controlling a computer to process queries in connection with a record base including a plurality of record base entries each of which includes a record identifier and a word identifier, each query containing at least one query word, the query processing system identifying records having a selected relationship between the query and the word identifiers contained in the record base, said method comprising:
A. a segmented posting file generation step in which commands are provided to enable said computer to generate, in response to said record base, a segmented posting file, said segmented posting file having a plurality of segmented posting file entries, at least some of said segmented posting file entries having a word identifier and a record identifier, said segmented posting file entries being represented by an array comprising a plurality of columns and rows, said rows being aggregated into segments each having a selected number of rows with each segment containing entries having word identifiers within an identified word identifier range; and
B. a query processing step in which, in a series of iterations each with respect to a query word in the query, commands are provided to enable said computer to:
  (i) receive respective portions of columns comprising a segment of the segmented posting file associated with the word identifier range containing the query word,
  (ii) identify entries in the segment whose word identifiers correspond to the query word, and
  (iii) modify a score maintained for the record identified in the identified entry,
records having a selected score at the end of the series of iterations being determined to have the selected relationship to the query.

27. A method as defined in claim 26 in which, in said record base, the record base entries are represented by an array comprising a plurality of columns and rows, each column of said record base having an associated column in said segmented posting file, the entries within each column of said record base having an order according to their respective word identifiers, during the segmented posting file generation step said computer establishing the segmented posting file in response to the record base in a series of segment generation iterations, the segmented posting file generation step including:
A. a segment word identifier determination step in which commands are provided to enable said computer to
  i. select for the segment generation iteration a record base entry in said record base as a segment word value determiner entry, and
  ii. identify as a segment word value identifier range value a value having a selected value relation to the word identifier values in the segment word value determiner entries; and
B. a segment establishment step in which commands are provided to enable said computer to generate a series of rows of the segmented posting file in a series of segment row generation iterations, the commands enabling the computer to
  i. determine whether a record base entry of the record base contains a word identifier having a value having a selected value relation to the segment word value identifier determination value; and
  ii. in response to a positive determination, copy the record base entry to an entry of the associated column of the segmented posting file and select the next record base entry of the record base for the next segment row generation iteration.

28. A method as defined in claim 27 in which the number of rows in a segment in the segmented posting file corresponds to a segment size factor,
   A. the segmented posting file generation step further including a record base entry identifier establishment step during which commands are provided to enable said computer to establish for each column of said record base a record base entry identifier, and a segment entry pointer establishment step during which commands are provided to enable said computer to establish a segment entry pointer;
   B. during the segment word value identifier determination step, providing commands to enable said computer to use the record base entry identifier in the selection of the segment word value determiner entry, and in addition providing commands to enable the computer to identify as a segment word value identifier determiner value the minimum of the word identifier values in the segment word value determiner entries; and
   C. during the segment establishment step, providing commands to enable said computer during a series of segment row generation iteration to use the segment entry pointer to establish segmented posting file entries in successive rows in a segment of said segmented posting file.

29. A method as defined in claim 28 further for controlling a mass storage system for storing data, said mass storage system being connected to said computer, the method including a storage control step for providing:
   A. commands to enable said computer to transfer of said segmented posting file after generation to said mass storage system for storage; and
   B. the transfer of segments of said segmented posting file from said mass storage system to said computer for processing in response to commands provided during said query processing step.

30. A method as defined in claim 29 in which during, said segmented posting file generation step, commands are further provided for enabling said computer to establish a segmented posting file index portion having a plurality of entries each associated with a segment of said segmented posting file and identifying for the associated segment the range of word identifier values of the entries in the segment.

31. A method as defined in claim 30 in which, during the query processing step, commands are provided to enable said computer to, for each word of the query, use the segmented posting file index portion to identify a segment which contains word identifier values corresponding to the word of the query, the commands enabling the computer and mass storage system to transfer the identified segment from the mass storage system to the computer.

32. A method as defined in claim 28 in which, for each segment generation iteration, during the segment word value identifier determination portion commands are provided to enable said computer to use, as the segment word value determiner entry for each column, a record base entry identified by the sum of the record base entry identifier for the column and the segment size factor.

33. A method as defined in claim 26 in which said query processing step includes:

A. a score table establishment step during which commands are provided to enable said computer to establish a score table having a plurality of score table entries each for receiving a score, each score table entry being associated with a record identified in the segmented posting file, and
   B. a score processing portion step during which, in a series of score generation iterations each with respect to a query word of the query, commands are provided to enable the computer to
      i. receive a segment of the segmented posting file associated with the word identifier range containing the query word, and
      ii. iteratively identify segmented posting file entries in the segment whose word identifiers correspond to the query word and modify the score in the score table entry of the score table maintained for the record identified in the identified segmented posting file entry,
      the records associated with score table entries containing a selected score at the end of the series of iterations being determined to have the selected relationship to the query.

34. A method of controlling a computer to enable the generation of a segmented posting file in response to a record base comprising a plurality of record base entries represented by an array comprising a plurality of columns and rows, the entries within each column having an order according to their respective word identifiers, the method enabling said computer to establish the segmented posting file in response to the record base in a series of segment generation iterations, during each segment generation iteration the method including:
   A. a segment word value identifier determination step during which commands are provided to enable said computer to
      i. select for the segment generation iteration a record base entry in said record base as a segment word value determiner entry, and
      ii. identify as a segment word value identifier range value a value having a selected value relation to the word identifier values in the segment word value determiner entries; and
   B. a segment establishment step during which commands are provided to enable said computer to, in a series of segment row generation iterations, establish a series of rows thereby to form a segment of said segmented posting file, for each row of the segment the commands enabling said computer to
      i. determine, for each column of the record base, whether a record base entry of the record base contains a word identifier having a value having a selected value relation to the segment word value identifier determination value and
      ii. in response to a positive determination, copy the record base entry to a segmented posting file entry in the associated column of the segmented posting file and select the next record base entry of the record base for the next segment row generation iteration.

35. A method as defined in claim 34 in which the number of rows in a segment in the segmented posting file corresponds to a segment size factor,
   A. the segmented posting file generation step further including a record base entry identifier establishment step during which commands are provided to enable said computer to establish a record base entry identifier for each column of the record base, and a segment entry pointer establishment step during which commands are provided to enable said computer to establish a segment entry pointer;

B. during the segment word value identifier determination step, providing commands to enable said computer to use the record base entry identifier in the selection of the segment word value determiner entry, and in addition providing commands to enable the computer to identify as a segment word value identifier determiner value the minimum of the word identifier values in the segment word value determiner entries; and C. during the segment establishment step, providing commands to enable said computer, during a series of segment row generation iterations, to use the segment entry pointer to establish segmented posting file entries in successive rows in a segment of said segmented posting file.

36. A method as defined in claim 35 in which, for each segment generation iteration, during the segment word value identifier determination portion commands are provided to enable said computer to use, as the segment word value determiner entry for each column, a record base entry identified by the sum of the record base entry identifier for the column and the segment size factor.

37. A query processing system for processing queries in connection with a record base including a plurality of record base entries each of which includes a record identifier and a word identifier, each query containing at least one query word, the query processing system identifying records having a selected relationship between the query and the word identifiers contained in the record base, said query processing system comprising:

A. a computer for performing processing operations in response to commands;

B. a control arrangement including:
   i. a segmented posting file generation control portion for providing commands to enable said computer to generate, in response to said record base, a segmented posting file, said segmented posting file having a plurality of segmented posting file entries, at least some of said segmented posting file entries having a word identifier and a record identifier, said segmented posting file entries being represented by an array comprising a plurality of columns and rows, said rows being aggregated into segments each having a selected number of rows with each segment containing entries having word identifiers within an identified word identifier range; and
   ii. a query processing control portion for providing, in a series of iterations each with respect to a query word in the query, commands to:
      (a) enable said computer to receive respective portions of columns comprising a segment of the segmented posting file associated with the word identifier range containing the query word,
      (b) identify entries in the segment whose word identifiers correspond to the query word, and
      (c) modify a score maintained for the record identified in the identified entry,
   records having a selected score at the end of the series of iterations being determined to have the selected relationship to the query.

38. A query processing system as defined in claim 37 further comprising a mass storage system for storing data, said mass storage system being connected to said computer and said control arrangement, A. said segmented posting file generation control portion enabling said computer to transfer said segmented posting file to said mass storage system for storage, and B. said query processing control portion enabling said mass storage system to, during each iteration, transfer the segment of said segmented posting file associated with the query word to said computer.

39. A query processing system as defined in claim 37 in which, in said record base, the record base entries are represented by an array comprising a plurality of columns and rows, each column of said record base having an associated column in said segmented posting file, the entries within each column of said record base having an order according to their respective word identifiers, the segmented posting file generation control portion enabling said computer to establish the segmented posting file in response to the record base in a series of segment generation iterations, the segmented posting file generation control portion including:

A. a segment word value identifier determination portion for providing commands to enable said computer to
   i. select for the segment generation iteration a record base entry from each column of said record base as a segment word value determiner entry, and
   ii. identify as a segment word value identifier range value a value having a selected value relation to the word identifier values in the segment word value determiner entries from all of said columns; and B. a segment establishment portion for, during each of said segment generation iterations, providing commands to enable said computer to generate a series of rows of the segmented posting file in a series of segment row generation iterations, the commands enabling the computer to, for each column of said record base,
   i. determine whether a record base entry from the column of the record base contains a word identifier having a value having a selected value relation to the segment word value identifier determination value and,
   ii. in response to a positive determination, copy the record base entry to a segmented posting file entry of an associated column of the segmented posting file and select the next record base entry from the respective column of the record base for the next segment row generation iteration.

40. A query processing system as defined in claim 39 in which the number of rows in a segment in the segmented posting file corresponds to a segment size factor, A. the segmented posting file generation control portion further including a record base entry identifier establishment portion for providing commands to enable said computer to establish, for each column of said record base, a record base entry identifier, and a segment entry pointer establishment portion for providing commands to enable said computer to establish a segment entry pointer;

B. the segment word value identifier determination portion for providing commands to enable said computer to use the record base entry identifiers in the selection of segment word value determiner entries from the respective columns of said record base, the segment word value identifier determination portion further providing commands to enable the computer to identify as a segment word value identifier determiner value the minimum of the word identifier values in the entries in the segment word value determiner entries; and C. the segment establishment portion provides commands to enable said computer during each segment row generation iteration to use the segment entry pointer to establish segmented posting file entries in a row in a segment of said segmented posting file.

41. A query processing system as defined in claim 40 further comprising a mass storage system connected to said computer for storing data, said query processing system further including:

A. the segmented posting file generation control portion further providing commands to enable transfer of said segmented posting file from said computer to said mass storage system for storage; and B. the query processing control portion further providing commands to the computer to enable the transfer of segments of said segmented posting file from said mass storage system to said computer for processing in response to further commands provided by said query processing control portion.

42. A query processing system as defined in claim 41 in which said segmented posting file generation control portion further provides commands for enabling said computer to establish a segmented posting file index portion having a plurality of entries each associated with a segment of said segmented posting file and identifying for the associated segment the range of word identifier values of the entries in the segment.

43. A query processing system as defined in claim 42 in which the query processing control portion further provides commands to said computer to enable it to, for each word of the query, use the segmented posting file index portion to identify a segment which contains word identifier values corresponding to the word of the query, the commands further enabling the identified segment to be transferred from the mass storage system to the computer.

44. A segmented posting file generating system as defined in claim 40 in which, for each segment generation iteration, the segment word value identifier determination portion generates commands to enable said computer to use, as the segment word value determiner entry for each column, a record base entry identified by the sum of the record base entry identifier for the column and the segment size factor.

45. A query processing system as defined in claim 37 in which said query processing control portion includes:

A. score table establishment portion for providing commands to enable said computer to establish a score table having a plurality of score table entries each for receiving a score, each score table entry being associated with a record identified in a column of the segmented posting file, and B. a score processing portion for, in a series of score generation iterations each with respect to a query word of the query, generating commands to enable the computer to:
  i. receive a segment of the segmented posting file associated with the word identifier range containing the query word, and
  ii. iteratively identify segmented posting file entries in the segment whose word identifiers correspond to the query word and modify the score in the score table entry maintained for the record identified in the identified segmented posting file entry, the records associated with score table entries containing a selected score at the end of the series of iterations being determined to have the selected relationship to the query.

46. A query processing system as defined in claim 45 further comprising a mass storage system for storing data, said computer generating storage control commands for controlling the transfer of segments of said segmented posting file from said mass storage system to said computer for processing in response to commands provided by said query processing control portion.

* * * * *